United States Patent [19]

Krishnamurthy et al.

[11] Patent Number: 5,100,447
[45] Date of Patent: Mar. 31, 1992

[54] ARGON RECOVERY FROM PARTIAL OXIDATION BASED AMMONIA PLANT PURGE GASES

[75] Inventors: Ramachandran Krishnamurthy, Piscataway; Mark J. Andrecovich, Somerville; Donald L. MacLean, Annandale, all of N.J.; Karen J. Wright, Johannesburg, South Africa

[73] Assignee: The BOC Group, Inc., New Providence, N.J.

[21] Appl. No.: 575,256

[22] Filed: Aug. 30, 1990

[51] Int. Cl.⁵ .................................................. F25J 3/04
[52] U.S. Cl. .................................. 62/22; 55/66; 62/24; 62/40
[58] Field of Search ............... 62/17, 18, 22, 23, 24, 62/40; 55/66

[56] References Cited

U.S. PATENT DOCUMENTS

| | | | |
|---|---|---|---|
| 4,549,890 | 10/1985 | Bligh | 62/22 |
| 4,687,498 | 8/1987 | MacLean et al. | 62/22 |
| 4,689,062 | 8/1987 | MacLean et al. | 62/18 |
| 4,750,925 | 6/1988 | MacLean et al. | 62/18 |
| 4,752,311 | 7/1988 | MacLean et al. | 62/18 |
| 4,861,361 | 8/1989 | Jain et al. | 62/18 |

*Primary Examiner*—Ronald C. Capossela
*Attorney, Agent, or Firm*—Robert I. Pearlman; Coleman R. Reap

[57] ABSTRACT

The present invention is directed to a method for recovering argon from a feed mixture comprising argon, carbon monoxide, methane, hydrogen, and nitrogen which comprises the steps of (a) passing the feed mixture through a pressure swing adsorption system to remove carbon monoxide, methane and part of the nitrogen thereby producing a fraction containing an increased amount of argon, and (b) passing the argon fraction to a cryogenic fractional distillation system to remove hydrogen and the remaining nitrogen in the fraction as a distillate product and to produce a pure argon product. In a second embodiment, the invention is directed to a method for recovering argon from a feed mixture comprising argon, carbon monoxide, methane, hydrogen, and nitrogen which comprises the steps of (a) passing the feed mixture through a first cryogenic fractional distillation system to remove carbon monoxide, hydrogen, and nitrogen as distillate products and to produce a fraction containing an increased amount of argon, and (b) passing the argon fraction to a second cryogenic fractional distillation system to remove methane and to produce pure argon as a distillate product.

26 Claims, 5 Drawing Sheets

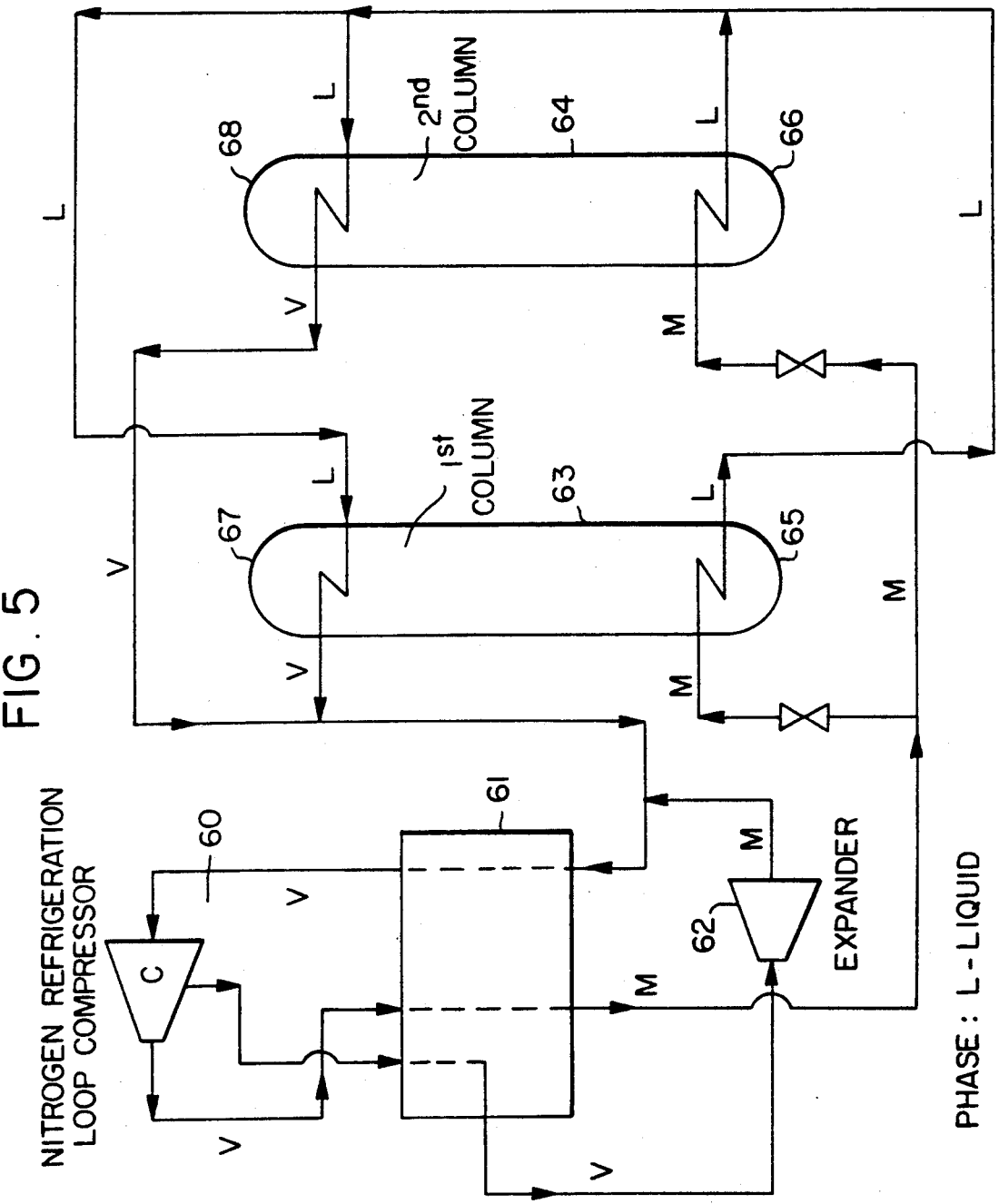

ARGON RECOVERY FROM PARTIAL OXIDATION BASED AMMONIA PLANT PURGE GASES

BACKGROUND OF THE INVENTION

1. Field of the Invention

The present invention is directed to a method for recovering argon from partial oxidation based ammonia plant purge gases. More particularly, the present invention is directed to a method for recovering argon from a gas mixture comprising argon, carbon monoxide, methane, hydrogen, and nitrogen.

2. Description of the Prior Art

The commercial preparation of argon by separation of air is well known in the art. Equivalent quantities of nitrogen and oxygen are also produced by this method. Because the demand for argon has been growing at a more rapid rate than the demand for nitrogen and oxygen, there is a need for alternative sources for producing argon. One such alternative source is the argon rich purge gas from an ammonia plant.

A conventional method for producing the hydrogen and nitrogen gas mixture for ammonia synthesis is primary steam reforming of natural gas or other hydrocarbon gas followed by secondary reforming of the gas with air. Contaminants in the hydrogen and nitrogen gas mixture, such as carbon monoxide and carbon dioxide, are removed by shift conversion (reaction of carbon monoxide with steam to form additional hydrogen and carbon dioxide), absorption in amines or other alkaline solvents (carbon dioxide removal), and methanation (conversion of trace carbon monoxide and carbon dioxide to methane).

Steam reforming to produce hydrogen consists of treating a hydrocarbon feed mixture with steam in a catalytic steam reactor (reformer) which consists of a number of tubes placed in a furnace at a temperature in the range from about 1250° F. to about 1700° F. The reversible reforming reactions which occur when methane is used as the hydrocarbon feed mixture are set out below.

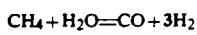

$$CH_4 + H_2O = CO + 3H_2$$

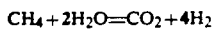

$$CH_4 + 2H_2O = CO_2 + 4H_2$$

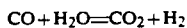

$$CO + H_2O = CO_2 + H_2$$

The hydrogen rich gas mixture exiting the steam reformer consists of an equilibrium mixture of hydrogen, steam, carbon monoxide, carbon dioxide, and unreacted methane. The reforming reactions are endothermic and therefore hydrocarbons and process waste gases are burned in the reformer furnace to provide the endothermic heat.

The gas mixture exiting the primary steam reformer is further heated and treated with air in the secondary reformer. Nitrogen in the air is used for ammonia synthesis and oxygen in the air is used to combust unreacted methane from the primary reformer to produce heat. This heat sustains the simultaneously occurring endothermic reforming reactions. The secondary reformer operates at a temperature between about 1850° F. and about 2700° F.

The hydrogen and nitrogen rich gas mixture from the secondary reformer is cooled and treated in a shift converter to aid in the conversion of carbon monoxide to carbon dioxide and additional hydrogen. After being cooled, the shift reactor gases are treated in a solvent absorption system to remove carbon dioxide. After removal of carbon dioxide, the hydrogen and nitrogen gas mixture is treated in a methanator to convert trace carbon oxides to methane. The gas mixture from the methanator is fed to the ammonia synthesis reactor.

Ammonia production processes and hydrogen production processes are disclosed in more detail in "Ammonia and Synthesis Gas: Recent and Energy Saving Processes", Edited by F.J. Brykowski, Chemical Technology Review No. 193, Energy Technology Review No. 68, Published by Noyes Data Corporation, Park Ridge, New Jersey, 1981, which disclosure is incorporated herein by reference.

Unreacted hydrogen and nitrogen in the ammonia synthesis reactor is recycled to the reactor. During recycle, argon, which enters the reactor via the air added in the secondary reformer, increases in concentration in the reactor gas. A purge stream is therefore periodically released from the ammonia synthesis reactor to remove argon.

Conventional methods for recovering argon from ammonia plant purge gas containing argon admixed with hydrogen, nitrogen, methane, and ammonia have generally focused on cryogenic processes which consist of first pretreating the gas to remove ammonia and then fractionating the gas in three cryogenic distillation columns. The first two columns separate hydrogen and nitrogen from the feed mixture and the third column separates methane to provide a pure liquid argon product and a pure methane product for use as fuel. The first cryogenic distillation column, which separates the bulk of the hydrogen contained in the ammonia purge gas, may be replaced with a pressure swing adsorption or membrane separation system.

U.S. Pat. Nos. 4,687,498, 4,750,925, and 4,752,311, issued to MacLean et al., disclose the recovery of argon from conventional ammonia plant purge gases which contain hydrogen, nitrogen, methane, and argon. The methods comprise removing methane and nitrogen from the purge gas mixture by pressure swing adsorption, then removing hydrogen, and finally cryogenically distilling the mixture to remove remaining amounts of nitrogen and hydrogen thereby preparing a pure argon product.

In a pressure swing adsorption system (PSA), a gaseous mixture is passed at an elevated pressure through a bed of an adsorbent material which selectively adsorbs one or more of the components of the gaseous mixture. Product gas, enriched in the unadsorbed gaseous component(s), is then withdrawn from the bed.

The term "gaseous mixture", as used herein, refers to a gaseous mixture, such as air, primarily comprised of two or more components having different molecular size. The term "enriched gas" refers to a gas comprised of the component(s) of the gaseous mixture relatively unadsorbed after passage of the gaseous mixture through the absorbent bed. The enriched gas generally must meet a predetermined purity level, for example, from about 90% to about 99%, in the unadsorbed component(s). The term "lean gas" refers to a gas exiting from the adsorption bed that fails to meet the predetermined purity level set for the enriched gas. When the strongly adsorbed component is the desired product, a cocurrent depressurization step and a cocurrent purge step of the strongly adsorbed component are added to the process.

The term "adsorption bed" refers either to a single bed or a serial arrangement of two beds. The inlet end of a single bed system is the inlet end of the single bed while the inlet end of the two bed system (arranged in series) is the inlet end of the first bed in the system. The outlet end of a single bed system is the outlet end of the single bed and the outlet end of the two bed system (arranged in series) is the outlet end of the second bed in the system. By using two adsorption beds in parallel in a system and by cycling (alternating) between the adsorption beds, product gas can be obtained continuously.

As a gaseous mixture travels through a bed of adsorbent, the adsorbable gaseous components of the mixture enter and fill the pores of the adsorbent. After a period of time, the composition of the gas exiting the bed of adsorbent is essentially the same as the composition entering the bed. This period of time is known as the breakthrough point. At some time prior to this breakthrough point, the adsorbent bed must be regenerated. Regeneration involves stopping the flow of gaseous mixture through the bed and purging the bed of the adsorbed components generally by venting the bed to atmospheric or subatmospheric pressure.

A pressure swing adsorption system generally employs two adsorbent beds operated on cycles which are sequenced to be out of phase with one another by 180° so that when one bed is in the adsorption or production step, the other bed is in the regeneration step. The two adsorption beds may be connected in series or in parallel. In a serial arrangement, the gas exiting the outlet end of the first bed enters the inlet end of the second bed. In a parallel arrangement, the gaseous mixture enters the inlet end of all beds comprising the system. Generally, a serial arrangement of beds is preferred for obtaining a high purity gas product and a parallel arrangement of beds is preferred for purifying a large quantity of a gaseous mixture in a short time cycle.

Between the adsorption step and the regeneration step, the pressure in the two adsorption beds is generally equalized by connecting the inlet ends of the two beds together and the outlet ends of the two beds together. During the pressure equalization step, the gas within the pores of the adsorption bed which has just completed its adsorption step (under high pressure) flows into the adsorption bed which has just completed its regeneration step (under low pressure) because of the pressure differential which exists between the two beds. The adsorption bed which completed its adsorption step is depressurized and the adsorption bed which completed its regeneration step is repressurized. This pressure equalization step improves the yield of the product gas because the gas within the pores of the bed which has just completed its adsorption step has already been enriched. When more than two beds are employed in the adsorption system, it is common to have a number of pressure equalizations steps.

Gas separation by the pressure swing adsorption method is more fully described in, for example, "Gas Separation by Adsorption Processes", Ralph T. Yang, Ed., Chapter 7, "Pressure Swing Adsorption: Principles and Processes" Butterworth 1987, and in U.S. Pat. Nos. 2,944,627, 3,801,513, and 3,960,522, which disclosures are incorporated by reference herein. Modifications and improvements in the pressure swing adsorption process and apparatus are described in detail in, for example, U.S. Pat. Nos. 4,415,340 and 4,340,398, which disclosures are incorporated by reference herein.

While the above methods provide processes for producing argon from a steam reformer based ammonia plant, none of the methods disclose the recovery of argon from a purge stream from a partial oxidation based ammonia plant The purge gas from a steam reformer based ammonia plant contains argon admixed with hydrogen, nitrogen, methane, and ammonia while the purge gas from a partial oxidation based ammonia plant contains argon admixed with hydrogen, nitrogen, carbon monoxide, and methane. Argon sources, which contain a high concentration of argon (streams which have an argon concentration higher than 6%), are particularly attractive because of the high value of argon and because such sources provide an opportunity for cost-effective argon recovery. The purge gas from a coal-based partial oxidation plant is one such attractive source of argon.

In a partial oxidation based ammonia plant, coal is gasified with oxygen and steam to yield a crude hydrogen rich gas mixture containing hydrogen admixed with carbon dioxide, carbon monoxide, hydrogen sulfide, argon, and unreacted methane. Argon enters the system with oxygen supplied to the gasifier by a cryogenic air separation plant. Typically, air is separated into an oxygen product and a nitrogen product. Argon distributes between the two products. When argon is not separated in the air separation plant, argon may be recovered from the partial oxidation based ammonia plant purge stream. The crude hydrogen rich gas mixture is treated to recover waste heat, to shift convert carbon monoxide to carbon dioxide, and to remove carbon dioxide and hydrogen sulfide, and other sulfur compounds that may be present The hydrogen rich gas mixture is then cooled to The air separation plant that provides oxygen for the gasification also provides nitrogen for the scrubbing. The liquid nitrogen used in the scrubber also contains argon as an impurity. In the liquid nitrogen scrubber, all of the impurities, such as carbon monoxide, methane, and argon, present in the hydrogen rich gas mixture are washed by the liquid nitrogen. The amount of liquid nitrogen in the scrubber is adjusted so that the vapor stream leaving the top of the scrubber contains stoichiometric amounts of hydrogen and nitrogen required for ammonia synthesis. The liquid product leaving the bottom of the liquid nitrogen scrubber is the waste stream and contains a mixture of argon admixed with hydrogen, nitrogen, carbon monoxide, and methane.

In one process variation, (Reference: Kirk & Othmer, Encyclopedia of Chemical Technology, Vol. 2, page 483), the waste stream from the liquid nitrogen scrubber is subjected to steam reforming and shift conversion and recycled with the hydrogen rich gas mixture from the gasifier. A portion of the waste stream or the recycle stream must be removed as a purge gas to prevent argon from accumulating in the system. This purge gas stream contains argon mixed with hydrogen, nitrogen, methane, and carbon monoxide. In another process variation (Reference: Kirk & Othmer), the waste stream is subjected to further cryogenic separation to separate the stream into various enriched streams for recycle to appropriate locations in the coal-gasification and hydrogen purification plant. Typically, an enriched argon waste stream is removed as a purge gas stream to prevent argon from accumulating in the system. This purge gas stream also contains argon admixed with nitrogen, carbon monoxide, methane, and optionally, hydrogen.

In addition to coal as a fuel source, the partial oxidation ammonia plant may employ alternative fuel sources such as hydrocarbon containing gas, oil, waste products having fuel value, or a mixture of the above fuel sources including coal in the gasification process to generate the hydrogen rich gas mixture.

The present invention provides an improved method for producing argon from partial oxidation based ammonia plant purge gas employing a combination of non-cryogenic and cryogenic separating steps. The present invention also provides a novel pressure swing adsorption method to remove methane, carbon monoxide and most of the nitrogen from argon in the purge gas exiting an ammonia synthesis plant.

SUMMARY OF THE INVENTION

The present invention is directed to a method for recovering argon from a feed mixture comprising argon, carbon monoxide, methane, hydrogen, and nitrogen which comprises the steps of (a) passing the feed mixture through a pressure swing adsorption system to remove carbon monoxide, methane and part of the nitrogen thereby producing a fraction containing an increased amount of argon, and (b) passing the argon fraction to a cryogenic fractional distillation system to remove hydrogen and the remaining nitrogen in the fraction as a distillate product and to produce a pure argon product. In a second embodiment, the invention is directed to a method for recovering argon from a feed mixture comprising argon, carbon monoxide, methane, hydrogen, and nitrogen which comprises the steps of (a) passing the feed mixture through a first cryogenic fractional distillation system to remove carbon monoxide, hydrogen, and nitrogen as distillate products and to produce a fraction containing an increased amount of argon, and (b) passing the argon fraction to a second cryogenic fractional distillation system to remove methane and to produce pure argon as a distillate product. In a third embodiment, the invention is directed to a method for recovering argon from a feed mixture comprising argon, carbon monoxide, methane, hydrogen, and nitrogen which comprises the steps of (a) passing the feed mixture through a first cryogenic fractional distillation system to remove methane and to produce a fraction containing an increased amount of argon as a distillate product, and (b) passing the argon fraction to a second cryogenic fractional distillation system to remove nitrogen, hydrogen, and carbon monoxide as a distillate product and to produce a pure argon product. The feed mixture comprising argon admixed with carbon monoxide, methane, hydrogen, and nitrogen can be a purge gas from a partial oxidation based ammonia plant wherein the feed stock is gas, coal, oil, or waste products.

BRIEF DESCRIPTION OF THE FIGURES

FIG. 5 is a schematic process flow diagram illustrating a refrigeration loop which may be employed with the cryogenic distillation columns in the present invention.

DETAILED DESCRIPTION OF THE INVENTION

Figure 1:
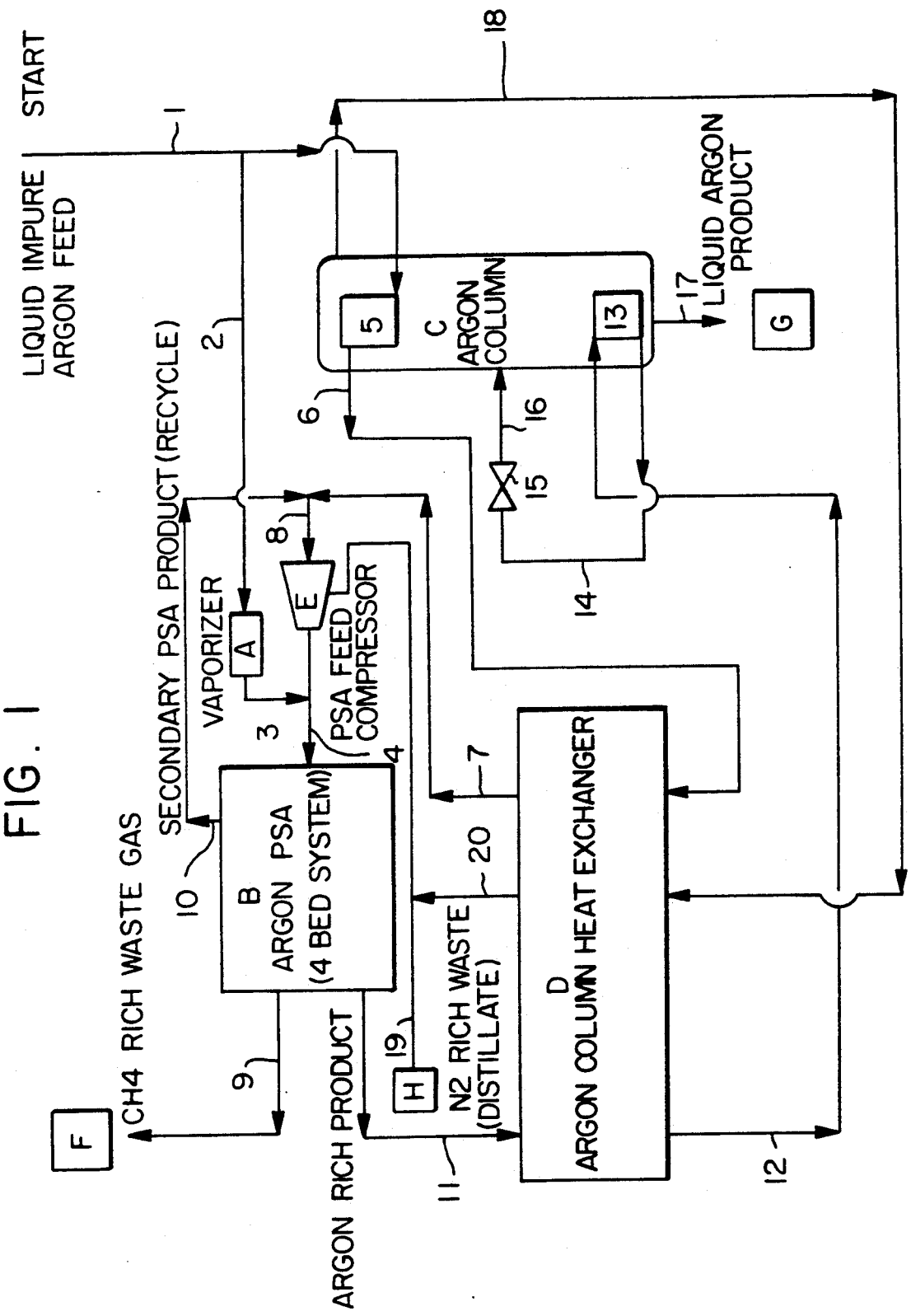
FIG. 1 is a schematic process flow diagram illustrating a first embodiment of the present invention which utilizes a pressure swing adsorption system to recover argon from a feed mixture comprising argon, carbon monoxide, methane, hydrogen, and nitrogen.

Applicants have discovered a method for recovering argon from a partial oxidation based ammonia plant purge gas which contains argon, carbon monoxide, methane, hydrogen, and nitrogen. In a preferred embodiment, a combination of non-cryogenic and cryogenic separation steps is utilized which efficiently and economically yields enriched argon in high purity. The non-cryogenic step comprises a pressure swing adsorption system which provides the critical separation of carbon monoxide, methane, and most of the nitrogen from argon. In an alternative embodiment, the feed mixture separation may be carried out utilizing a combination of cryogenic separation steps.

In a first embodiment, carbon monoxide, methane and part of the nitrogen are removed from the feed mixture by pressure swing adsorption to produce a fraction containing an increased amount of argon. The argon rich fraction is then separated in a cryogenic fractional distillation system to remove hydrogen and any remaining nitrogen in the mixture as a distillate product thereby producing a pure argon product. In a second embodiment, carbon monoxide, nitrogen, and hydrogen are removed from the feed mixture as distillate products in a first cryogenic fractional distillation system to produce a fraction containing an increased amount of argon. The argon rich fraction is then separated in a second cryogenic fractional distillation system to remove methane and to produce pure argon as a distillate product. In a third embodiment, methane is removed from the feed mixture in a first cryogenic fractional distillation system to produce a fraction containing an increased amount of argon as a distillate product. The argon rich fraction is then separated in a second cryogenic fractional distillation system to remove nitrogen, hydrogen, and carbon monoxide as distillate products and to produce a pure argon product.

The non-cryogenic pressure swing adsorption separation method of the present invention provides significant savings in capital and operating expense over completely cryogenic methods. When feed mixture is available at high pressure, this pressure energy can be used to provide most of the gas compression energy requirements in the non-cryogenic separation. The feed mixture may also be cooled and expanded in a turbine to provide cooling for the later cryogenic separation.

The steps in the present method may be integrated into steps in the ammonia synthesis to enhance ammonia production. For example, the carbon monoxide rich fraction from the pressure swing adsorption step may be recycled and used as fuel in the ammonia plant. Alternatively, the carbon monoxide rich fraction may be compressed and recycled for use in the hydrogen generation process of the ammonia plant. The carbon monoxide rich fraction may also be further purified to yield merchant grade (98+%) carbon monoxide. In addition, if cryogenic purification is employed in the ammonia plant for the preparation of synthesis gas, the refrigeration loop in the cryogenic step in the present method can be integrated into the refrigeration loop of the ammonia plant cryogenic purification step. The cryogenic step in the present method can also be integrated into the nitrogen liquifaction step in the air separation plant to provide gaseous oxygen and liquid nitrogen to the partial oxidation ammonia plant. The nitrogen liquifaction system in the air separation plant and the cryogenic system in the present method can share the same refrigeration loop.

The feed mixture (waste gas, feed gas, off-gas) in the present invention is a partial oxidation based ammonia plant purge gas which comprises argon, hydrogen, methane, carbon monoxide, and nitrogen. The feed mixture is a waste gas from the liquid nitrogen scrubbing section of a coal based ammonia plant. The feed mixture will in general comprise argon in an amount greater than about 3%, carbon monoxide in an amount up to about 40%, methane in an amount up to about 40%, nitrogen in an amount up to about 50%, and hydrogen in an amount up to about 30%.

The method of the present invention may also be used for recovering argon from gas mixtures outside this composition range. For example, feed mixtures containing greater than 30% hydrogen may also be employed in the present invention. A portion of the hydrogen in the feed mixture can be first removed by conventional separation methods to reduce the hydrogen content of the feed mixture to 30% or less prior to recovering argon from the mixture according to the present method. Such conventional hydrogen separation methods include pressure swing adsorption, cryogenic distillation, and membrane separation.

The feed mixture may be employed in liquid or gas form. A liquid feed mixture can be used to provide the refrigeration to generate the reflux in the cryogenic gaseous, the reflux for the cryogenic fractional distillation column must be provided by a nitrogen refrigeration loop. In a preferred embodiment, the feed mixture is a liquid feed mixture.

A typical feed mixture will have a pressure in the range from about 25 psia to about 800 psia, preferably from about 40 psia to about 400 psia, and more feed mixture is available at a sub-ambient temperature, the refrigeration is extracted from the mixture before passing the mixture to the pressure swing adsorption system.

The method for producing argon from a feed mixture comprising argon, hydrogen, methane, carbon monoxide, and nitrogen can be better understood by reference to the FIGURES in which like numerals refer to like parts of the invention throughout the FIGURES. Although the present invention is described and illustrated in connection with preferred embodiments, applicants intend that modifications and variations may be used without departing from the spirit of the present invention.

FIG. 1 illustrates a preferred first embodiment of the present invention for recovering argon from a feed mixture containing argon admixed with hydrogen, nitrogen, methane and carbon monoxide by a combination of non-cryogenic and cryogenic means. In FIG. 1, liquid feed mixture is fed through feed conduits 1 and 2 to vaporizer A to vaporize the feed mixture. The vaporized feed mixture is then passed into argon pressure swing adsorption system B through feed conduits 3 and 4 to separate the mixture. Alternatively, a portion of the liquid feed mixture can be fed through feed conduit 1 to distillation column condenser 5 in argon cryogenic fractional distillation column C to partially vaporize the feed mixture and provide the reflux to the distillation column. The feed mixture can be further warmed by passing the mixture to the argon column heat exchanger D via feed conduit 6. Refrigeration from the feed mixture is passed to heat exchanger D for cooling argon feed mixture from argon pressure swing adsorption system B. The warmed vaporized feed mixture is then passed into argon pressure swing adsorption feed compressor E through feed conduits 7 and 8. Compressor E compresses the feed mixture to the pressure swing adsorption separation pressure. The compressed feed mixture is then passed into argon pressure swing adsorption system B via feed conduit 4 to separate the mixture.

In general, the feed mixture is compressed in compressor E to an operating pressure swing adsorption pressure in the range from about 25 psia to about 800 psia, preferably from about 50 psia to about 400 psia, and more preferably from about 50 psia to about 150 psia. The temperature of the feed mixture entering the pressure swing adsorption system will be ambient.

During the production step, the feed mixture is separated in argon pressure swing adsorption system B to remove carbon monoxide, methane and part of the nitrogen and to produce a fraction containing an increased amount of argon. An argon rich fraction is withdrawn from argon pressure swing adsorption system B and fed through feed conduit 11 for further purification in argon cryogenic fractional distillation column C.

During the regeneration step, a carbon monoxide, methane and nitrogen rich fraction is withdrawn from argon pressure swing adsorption system B via feed conduit 9 and passed to carbon monoxide, methane and nitrogen product reservoir F. The carbon monoxide, methane and nitrogen rich fraction may be recycled as fuel to the ammonia plant, or may be recycled to an appropriate location in the partial oxidation based ammonia plant depending upon the relative amounts of the various components, or may be further purified to prepare merchant grade carbon monoxide.

During the intermediate depressurization step, vent gas (secondary product gas) is collected from pressure swing adsorption system B and recycled through feed conduit 10. The secondary product gas is then mixed with fresh feed mixture in feed conduit 7 and compressed in compressor E to the operating pressure for recycling to the pressure swing adsorption system B.

During production, the argon rich fraction from argon pressure swing adsorption system B is fed through feed conduit 11 to argon column heat exchanger D where the feed mixture is cooled to close to its liquefaction point (with refrigeration derived from the outgoing recycle gas stream). The cooled argon rich fraction may be optionally expanded, such as in a turbine expander, for further cooling. Cooled argon gas from heat exchanger D is fed through feed conduit 12 to reboiler 13 in argon cryogenic fractional distillation column C for further cooling. The partially liquified argon-rich fraction accepts refrigeration from reboiler 13. After being substantially liquified, the argon-rich feed from reboiler 13 passes to argon cryogenic fractional distillation column C via feed conduit 14, expansion valve 15, and feed conduit 16.

Nitrogen not removed in the pressure swing adsorption system and any hydrogen in the feed mixture is then cryogenically fractionally distilled from argon in cryogenic fractional distillation column C. The nitrogen and hydrogen rich fraction is removed from the top of the distillation column condenser 5 at the top of argon cryogenic fractional distillation column C as a distillate stream. The nitrogen and hydrogen rich fraction is passed through feed conduit 18 to argon column heat exchanger D where the nitrogen rich gas is brought to ambient temperature. Refrigeration from the nitrogen rich gas is passed to heat exchanger D for cooling argon feed mixture from argon pressure swing adsorption system B. Warmed nitrogen rich gas is then passed from heat exchanger D through feed conduit 20 to nitrogen reservoir H. Alternatively, the nitrogen rich fraction may be recycled to argon pressure swing adsorption system B by venting the distillate stream from the top of argon cryogenic fractional distillation column C through feed conduit 18 to argon column heat exchanger D. Warmed nitrogen rich gas is then passed from heat exchanger D through feed conduits 20 and 8 to feed compressor E. Compressor E compresses the recycle gas which is passed through feed conduit 4 to argon pressure swing adsorption system B. The nitrogen rich fraction may also be used as a purge gas in the pressure swing adsorption system.

Pure argon product is withdrawn from the bottom of argon cryogenic fractional distillation column C to argon product reservoir G via feed conduit 17.

Figure 2:
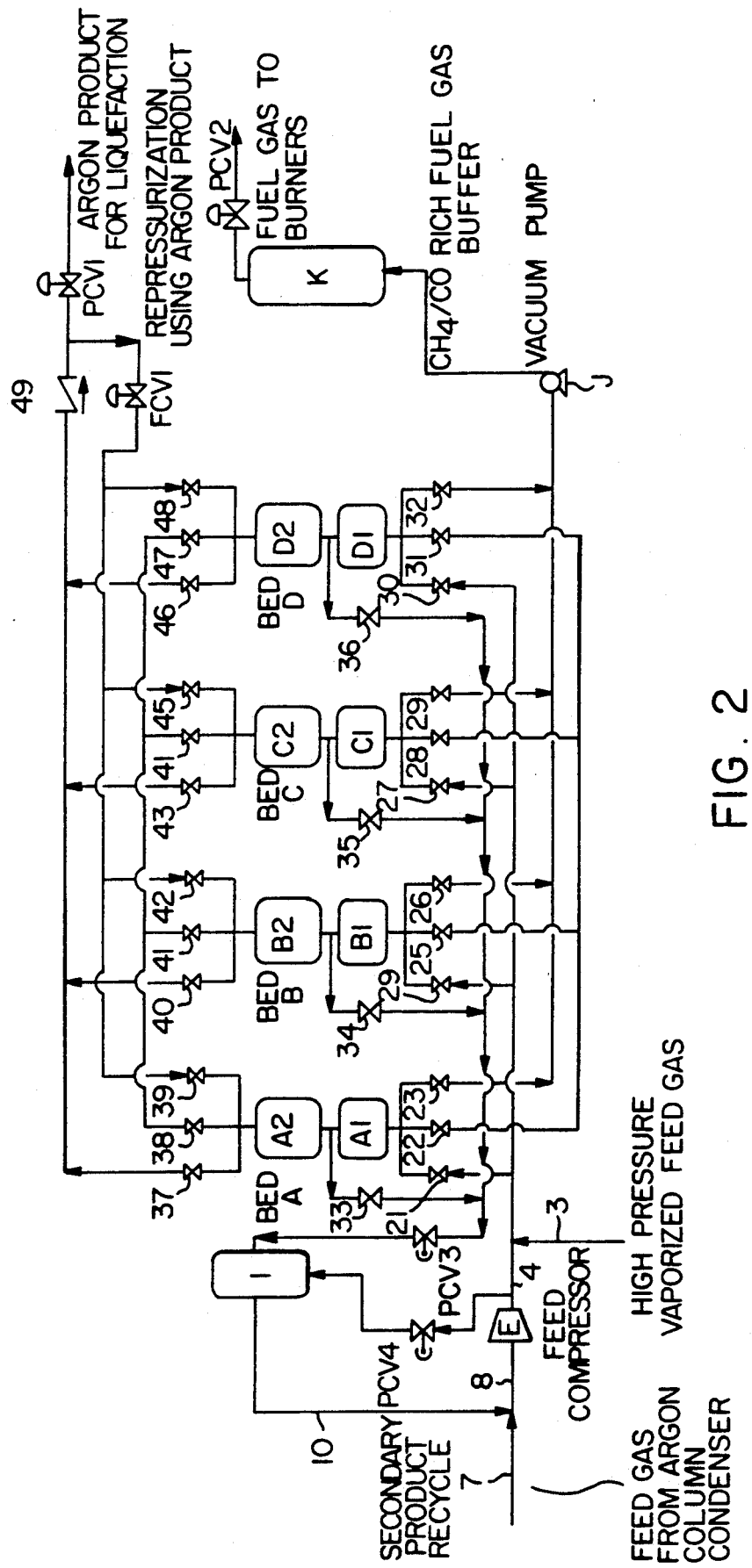
FIG. 2 is a schematic process flow diagram illustrating a pressure swing adsorption method for separating carbon monoxide, methane and part of the nitrogen from argon in a feed mixture according to the present invention.

FIG. 2 illustrates a pressure swing adsorption method for separating carbon monoxide, methane and most of the nitrogen from a feed mixture to produce an argon rich fraction according to the present invention. As set out in FIG. 1, the vaporized feed mixture from argon cryogenic fractional distillation column C and argon column heat exchanger D is passed to argon pressure swing adsorption feed compressor E. Compressor E compresses the feed mixture to the separation pressure and feeds the mixture at ambient temperature via feed conduit 4 to argon pressure swing adsorption system B (see FIG. 1). Alternatively, high pressure gaseous feed mixture from the partial oxidation based ammonia plant can be passed through feed conduit 3 to join the compressed feed mixture in feed conduit 4.

In FIG. 2, argon pressure swing adsorption system comprises adsorption beds A1, A2, B1, B2, C1, C2, D1, and D2, secondary product surge tank I, vacuum pump J, methane-carbon monoxide rich fuel gas buffer vessel K, argon product pressure control valve PCV1, carbon monoxide rich fuel gas pressure control valve PCV2, secondary product pressure control valve PCV3, feed compressor discharge pressure control valve PCV4, repressurization flow control valve FCV1, expansion valves 21 through 48, and non-return valve 49.

Each of the adsorption beds, A through D, is physically divided into two bed parts, A1/A2, B1/B2, C1/C2, and D1/D2, respectively, to facilitate removal of a secondary product recycle stream from an intermediate position in the bed. The secondary product recycle stream is drawn at an intermediate pressure, for example at about 25 psia, and passed to secondary product surge tank I. The secondary product stream is then passed through feed conduit 10 to feed conduits 7 and 8 to be mixed with fresh feed mixture, compressed to pressure swing adsorption operating pressure in compressor E, and passed to the pressure swing adsorption system. The pressure swing adsorption system is operated in accordance with the full cycle sequence shown in Table 1. The sequence is described below in detail using beds A1/A2. Beds B1/B2, C1/C2, and D1/D2 are employed in the same sequence but at an offset as shown in Table 1.

TABLE 1

Four Bed Argon Pressure Swing Adsorption Cycle Sequence

| Step No. | Bed A | Bed B | Bed C | Bed D | Valves Open |
|---|---|---|---|---|---|
| 1 | Feed gas Product gas | Eq.Press. (repress.) | Vacuum Regenerate | Eq.Press. (depress.) | 21, 25, 29, 31 37, 41, 47 |
| 2 | Feed gas Product gas | Repressurize Product gas | Vacuum Regenerate | Intermediate Depressurize | 21, 29, 36, 37 42 |
| 3 | Eq.Press. (depress.) | Feed gas Product gas | Eq.Press. (repress.) | Vacuum Regenerate | 22, 24, 28, 32 38, 40, 44 |
| 4 | Intermediate Depressurize | Feed gas Product gas | Repressurize Product gas | Vacuum Regenerate | 24, 32, 33, 40 45 |
| 5 | Vacuum Regenerate | Eq.Press. (depress.) | Feed gas Product gas | Eq.Press. (repress.) | 23, 25, 27, 31 41, 43, 47 |
| 6 | Vacuum Regenerate | Intermediate Depressurize | Feed gas Product gas | Repressurize Product gas | 23, 27, 34, 43 48 |
| 7 | Eq.Press (repress.) | Vacuum Regenerate | Eq.Press. (depress.) | Feed gas Product gas | 22, 26, 28, 30 38, 44, 46 |
| 8 | Repressurize Product gas | Vacuum Regenerate | Intermediate Depressurize | Feed gas Product gas | 26, 30, 35, 39 46 |

| | |
|---|---|
| Feed gas Product gas | Feed gas admitted to bottom of bed. Product gas released from top of bed. |
| Eq.Press. (depress.) | Bed pressure equalized to another bed at lower pressure through top and bottom ends of beds. |
| Intermediate Depressurize | Bed depressurized from intermediate location and intermediate gas collected in buffer vessel, compressed, and recycled to feed gas. |
| Vacuum Regenerate | Bed opened to vacuum pump through bottom end of bed. |
| Eq.Press. (repress.) | Bed pressure equalized to another bed at higher pressure through top and bottom ends of beds. |
| Repressurize Product gas | Repressurization of bed to adsorption pressure by backfill with product gas through top of bed. |

At the start of the pressure swing adsorption cycle, bed A1/A2 is in the argon production step. Feed mixture from feed conduit 4 is passed to the inlet end of bed A1 via open stop valve 21. The feed mixture is adsorbed in adsorption bed A1/A2 to selectively sieve carbon monoxide, methane and part of the nitrogen to produce a fraction containing an increased concentration of argon. Product gas, enriched in argon and having a predetermined purity, is withdrawn from the outlet end of bed A2 via open stop valve 37 and passed to the argon product pressure control valve PCV1 for further purification in argon cryogenic fractional distillation column C (see FIG. 1). The product gas enriched in argon typically contains between about 70% and about 95% of the argon in the feed mixture admixed with essentially all of the hydrogen in the feed mixture and from about 20% to about 40% of the nitrogen in the feed mixture.

When the methane in the feed mixture advances close to the product end of bed A2, the argon production step in bed A1/A2 is stopped. Stop valves 21 and 37 are closed stopping the production of argon. Bed A1/A2 is then depressurized and bed C1/C2 is repressurized by pressure equalization of the beds. Stop valves 22 and 28 are opened and lean gas is passed from the inlet end of bed A1 to the inlet end of bed C1. At the same time, stop valves 38 and 44 are opened and lean gas is passed from the outlet end of bed A2 to the outlet end of bed C2 to substantially equalize the pressure of bed A1/A2 and bed C1/C2. Optionally, bed A1/A2 may be pressure equalized with an equalization tank through the argon enriched product end. The gas collected in the equalization tank is subsequently used to repressurize a bed in the pressure swing adsorption system.

When the pressure equalization step is complete, bed A1/A2 is further depressurized by an intermediate depressurization step. Stop valves 22, 28, 38, and 44 are closed and stop valve 33 is opened to withdraw a secondary product recycle stream from an intermediate position in bed A1/A2. The secondary product recycle stream is drawn at an intermediate pressure, for example at about 25 psia, and passed to secondary product surge tank I. The secondary recycle product from secondary product surge tank I is then passed to feed conduit 10 to be mixed with fresh feed mixture in feed conduits 7 and 8. The mixed feed mixture is compressed to the pressure swing adsorption operating pressure in compressor E and recycled to the pressure swing adsorption system.

After the intermediate depressurization step, bed A1/A2 is regenerated. Stop valve 33 is closed and stop valve 23 is opened. Bed A1/A2 is evacuated to the desorption pressure with vacuum pump J. In general, the desorption pressure is from about 75 torr to about 350 torr, preferably from about 75 torr to about 200 torr. Optionally, argon enriched gas from producing bed C1/C2 may be passed as a product purge through the outlet end of bed A1 via stop valve 39 during evacuation.

After the regeneration step, bed A1/A2 is repressurized and bed C1/C2 is depressurized by pressure equalization of the beds. Stop valve 23 is closed and stop valves 22 and 28 are opened. Void gas is passed from the inlet end of bed C1 to the inlet end of bed A1. At the same time, stop valves 38 and 44 are opened and void gas is passed from the outlet end of bed C2 to the outlet end of bed A2 to substantially equalize the pressure of bed A1/A2 and bed C1/C2.

After the repressurization step, bed A1/A2 is backfilled with argon product gas. Stop valves 22, 28, 38, and 44 are closed and bed A1/A2 is repressurized by backfill with product gas. Product gas from producing bed D1/D2 is passed through repressurization flow control valve FCV1 and into the outlet end of bed A2 to backfill bed A1/A2 through stop valve 39.

When the backfill step is complete, bed A1/A2 again produces argon. Repressurization flow control valve FCV1 and stop valve 39 are closed and stop valves 21 and 37 are opened to admit feed mixture from compressor E to the inlet end of bed A1. The argon production step in bed A1/A2 is begun and the cycle is repeated. Beds A1/A2, B1/B2, C1/C2, and D1/D2 operate in the sequence set out in Table 1. In general, the time to complete a cycle (cycle time) is in the range from about 60 seconds to about 1500 seconds, preferably from about 240 seconds to about 960 seconds, and more preferably from about 480 seconds to about 720 seconds.

Figure 3:
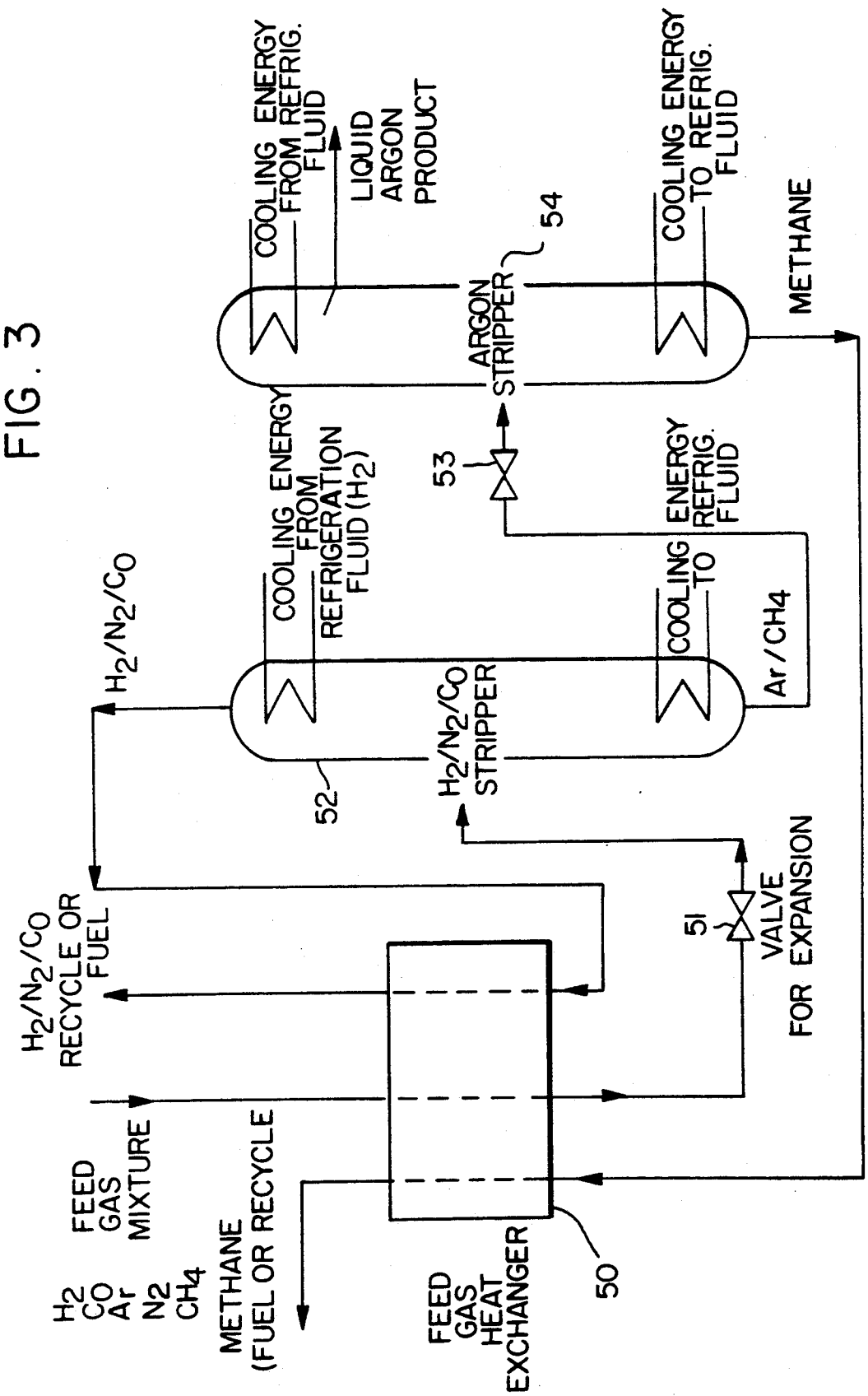
FIG. 3 is a schematic process flow diagram illustrating a second embodiment of the present invention which utilizes two cryogenic distillation columns to recover argon from a feed mixture comprising argon, carbon monoxide, methane, hydrogen, and nitrogen.

FIG. 3 illustrates a second embodiment of the present invention for cryogenically recovering argon from a feed mixture containing argon admixed with hydrogen, nitrogen, methane and carbon monoxide. In FIG. 3, a gaseous feed mixture at ambient temperature is cooled in heat exchanger 50 to a temperature close to its saturation point. The gaseous feed mixture is expanded through expansion valve 51 to further cool the gas and is then passed to first cryogenic column 52 which typically operates at a moderate pressure, for example, about 50 psia. The column pressure may vary over a wide range since an optimal pressure is dependent on the composition of the feed mixture.

In first cryogenic column 52, the feed mixture is separated into an argon enriched fraction which also contains most of the methane present in the feed mixture and an argon depleted fraction which contains all of the hydrogen, nitrogen, and carbon monoxide in the feed mixture. The argon depleted fraction, which contains the components having a lower boiling point than argon, is removed as a distillate product. The argon depleted fraction can provide the refrigeration to pre-cool the feed mixture in the heat exchanger 50. The argon depleted fraction can then be either used as fuel or can be compressed and recycled to an appropriate location in the partial oxidation ammonia plant. The location to where the argon depleted fraction is recycled is dependent upon the composition of the mixture. If the argon depleted fraction is nitrogen or hydrogen rich, the fraction can be recycled to the nitrogen scrubber feed mixture. If the argon depleted fraction is carbon monoxide rich, the fraction can be recycled and fed to the shift convertor following the gasifier (partial oxidation reactor).

The argon enriched fraction is removed from the bottom of first cryogenic column 52 and expanded in expansion valve 53 to the operating pressure of second cryogenic column 54. In second cryogenic column 54, the argon enriched fraction is split into a pure argon distillate product which is removed as a liquid and a methane rich product which is removed as vapor from the bottom of second cryogenic column 54. The methane rich product is passed through the heat exchanger 50 to extract the refrigeration available from the product and the product is then used as fuel or is compressed and recycled to the ammonia plant gasifier feed mixture. The methane rich product may also be removed as a liquid, pumped to a desired high pressure, and then vaporized and warmed in heat exchanger 50. Alternatively, the methane rich product from second cryogenic column 54 can be mixed with the distillate product from first cryogenic column 52 and the mixture recycled to the ammonia plant gasifier feed.

Figure 4:
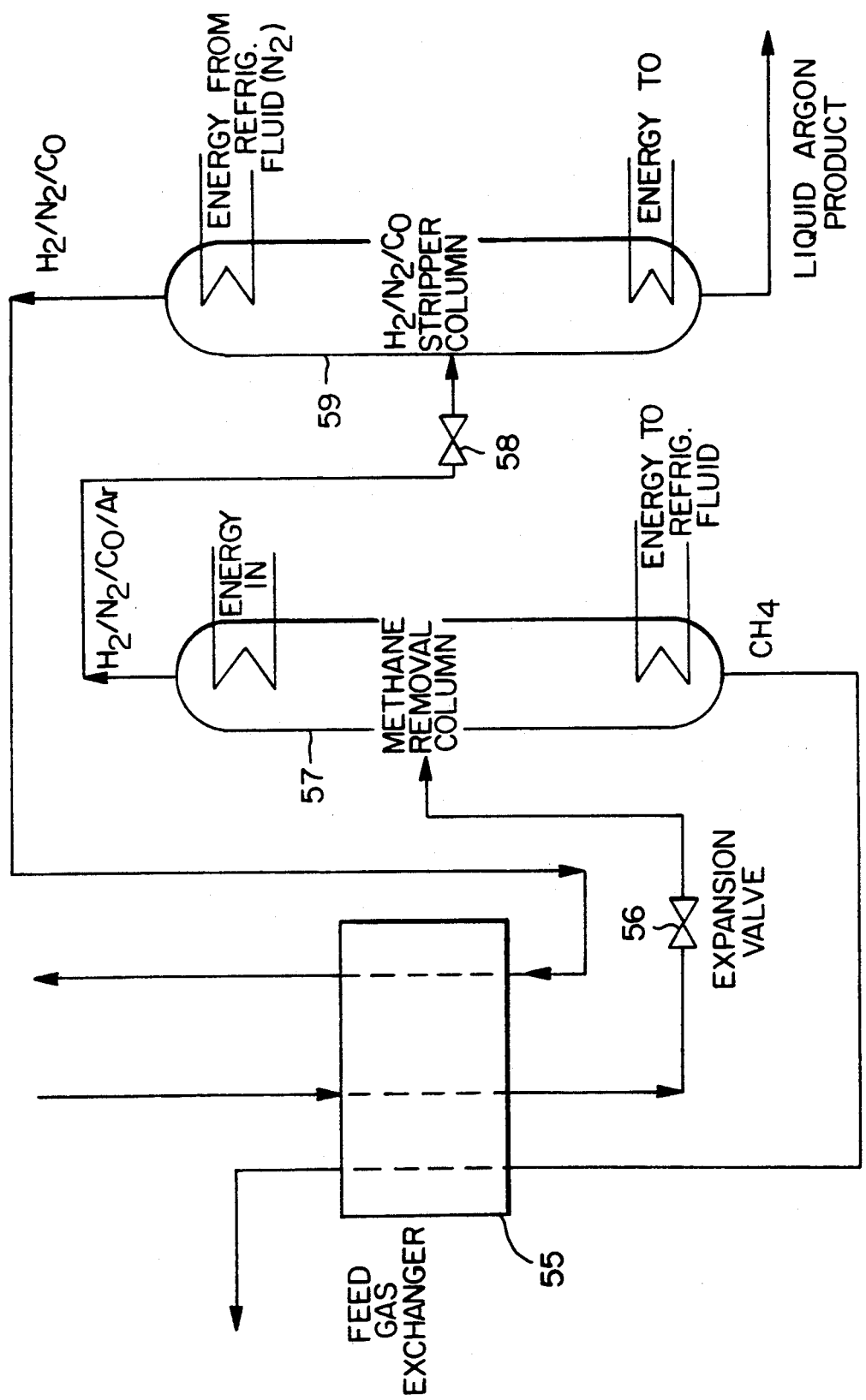
FIG. 4 is a schematic process flow diagram illustrating a third embodiment of the present invention which utilizes two cryogenic distillation columns to recover argon from a feed mixture comprising argon, carbon monoxide, methane, hydrogen, and nitrogen.

FIG. 4 illustrates a third embodiment of the present invention for cryogenically recovering argon from a feed mixture containing argon admixed with hydrogen, nitrogen, methane and carbon monoxide In FIG. 4, a gaseous feed mixture at ambient temperature is cooled in heat exchanger 55 to a temperature close to its saturation point. The gaseous feed mixture is expanded through expansion valve 56 to further cool the gas and then passed to first cryogenic column 57 which typically operates at a moderate pressure, for example, about 50 psia.

In first cryogenic column 57, the feed mixture is separated into an argon enriched fraction which also contains most of the hydrogen, nitrogen, and carbon monoxide present in the feed mixture and an argon depleted fraction which contains all of methane in the feed mixture. The argon depleted, methane rich fraction is removed as a product from the bottom of first cryogenic column 57. The argon depleted, methane rich fraction can provide the refrigeration to pre-cool the feed mixture in heat exchanger 55. The argon depleted fraction can then be used either as fuel or can be compressed and recycled to the partial oxidation ammonia plant gasifier feed.

The argon enriched fraction is removed as a distillate product from the top of first cryogenic column 57 and expanded in expansion valve 58 to the operating pressure of second cryogenic column 59. In second cryogenic column 59, the argon enriched fraction is split into a pure argon product which is removed as a liquid from the bottom of second cryogenic column 59 and an argon depleted distillate product. The argon depleted distillate product is warmed in the heat exchanger 55 to extract the refrigeration. The argon depleted distillate product can then be either used as fuel or can be compressed and recycled to an appropriate location in the partial oxidation ammonia plant. The location to where the argon depleted distillate product is recycled is dependent on the composition of the mixture. If the argon depleted distillate product is nitrogen or hydrogen rich, the argon depleted distillate product can be recycled to the nitrogen scrubber feed mixture. If the argon depleted distillate product is carbon monoxide rich, the argon depleted distillate product can be recycled and fed to the shift convertor following the gasifier. Alternatively, the methane rich product from first cryogenic column 57 can be mixed with the distillate product from second cryogenic column 59 and the mixture recycled to the ammonia plant gasifier feed.

A nitrogen refrigeration loop (refrigeration circuit, refrigeration cycle) is typically employed to extract refrigeration from the reboilers and provide refrigeration to the column condensers. The cryogenic columns require refrigeration to condense a portion of the distillate product as a reflux stream. Refrigeration is also required to liquefy the argon product in the second cryogenic column condenser. Refrigeration is available at the reboilers of the two cryogenic columns but at higher temperatures compared to the corresponding column condenser condition.

FIG. 5 illustrates a typical refrigeration loop. Many variations of the refrigeration loop (circuit) are possible and the selection of a specific loop depends on the particular separation process for a given feed mixture. The nitrogen refrigeration circuit works as a heat pump to extract refrigeration at a warmer temperature from the column reboilers and to supply refrigeration to the column condensers at a colder temperature. Nitrogen is the preferred refrigeration fluid for the operating temperatures in the process. The flow rate of nitrogen for recirculation is based on the refrigeration required at the column condensers.

In FIG. 5, recirculating nitrogen is compressed in compressor 60 to a high pressure. Typically, this pressure must exceed the pressure corresponding to the boiling point of nitrogen at the temperature of both reboilers. The compressed nitrogen is cooled by heat exchange with outgoing cold product streams in heat exchanger 61. The compressed fraction may optionally be expanded in expansion valve 62. The compressed nitrogen fraction is then split into two fractions and each fraction enters one column reboiler, 65 and 66, in cryogenic columns 63 and 64, respectively, and is completely condensed.

The liquid nitrogen fractions leaving reboilers 65 and 66 are mixed and optionally expanded to sub-cool the fractions. The liquid fraction is again split into two fractions, one fraction for each column condenser, 67 and 68, in cryogenic columns 63 and 64, respectively. Each nitrogen fraction is expanded and vaporized in column condensers 67 and 68 to provide refrigeration to generate reflux or condense argon product. The vaporized nitrogen fractions are mixed and optionally passed through a sub-cooler to cool the liquid stream entering the condensers. The vapor stream is then heat exchanged in heat exchanger 61 to cool the high pressure nitrogen from the discharge of the refrigeration cycle compressor.

When the refrigeration required at the column condensers significantly exceeds the energy available at the reboilers, additional liquid must be made by expanding a portion of the high pressure nitrogen stream. This portion is taken from the discharge of a multi-stage refrigeration cycle compressor or from the discharge of an intermediate stage in the refrigeration cycle compressor, cooled in the heat exchanger, and then expanded in a turbine to generate significant refrigeration which is transferred to the high pressure nitrogen stream from the compressor discharge. The expander discharge stream is mixed with the vaporized stream returning from the column condensers. The work generated in the expander may also be recovered by using the expander to compress a gas stream The expander and compressor would then share a common shaft. For example, the refrigeration cycle compressor will discharge at a certain pressure and the compressor attached to the expander will compress it further.

In a preferred embodiment, the present invention is directed at a method for recovering argon from a feed mixture comprising argon, carbon monoxide, methane, hydrogen, and nitrogen which comprises the steps of:
 (a) passing the feed mixture through a pressure swing adsorption system to remove carbon monoxide, methane and part of the nitrogen thereby producing a fraction containing an increased amount of argon; and
 (b) passing the argon fraction to a cryogenic fractional distillation system to remove hydrogen and the remaining nitrogen in the fraction as a distillate product and to produce a pure argon product.

In another embodiment, the present invention is directed at a method for recovering argon from a feed mixture comprising argon, carbon monoxide, methane, hydrogen, and nitrogen which comprises the steps of:
 (a) passing the feed mixture through a first cryogenic fractional distillation system to remove carbon monoxide, hydrogen, and nitrogen as distillate products thereby producing a fraction containing an increased amount of argon; and (b) passing the argon rich fraction to a second cryogenic fractional distillation system to remove methane thereby producing a pure argon as a distillate product.

In yet another embodiment, the present invention is directed at an improved method for recovering argon from a feed mixture comprising argon, carbon monoxide, methane, hydrogen, and nitrogen which comprises the steps of:

(a) passing the feed mixture through a first cryogenic fractional distillation system to remove methane thereby producing a fraction containing an increased amount of argon as a distillate product; and (b) passing the argon rich fraction to a second cryogenic fractional distillation system to remove nitrogen, hydrogen, and carbon monoxide as a distillate product thereby producing a pure argon product.

The selectivity of the adsorbent material in the bed of the pressure swing adsorption system for a gaseous component is generally governed by the volume of the pore size and the distribution of that pore size in the adsorbent. Gaseous molecules with a kinetic diameter less than, or equal to, the pore size of the adsorbent are adsorbed and retained in the adsorbent while gaseous molecules with a diameter larger than the pore size of the adsorbent pass through the adsorbent. The adsorbent thus sieves the gaseous molecules according to their molecular size, The adsorbent may also separate molecules according to their different rates of diffusion in the pores of the adsorbent.

Zeolite molecular adsorbents adsorb gaseous molecules with some dependence upon crystalline size. In general, adsorption into zeolite is fast and equilibrium is reached typically in a few seconds. The sieving action of zeolite is generally dependent upon the difference in the equilibrium adsorption of the different components of the gaseous mixture. When air is separated by a zeolite adsorbent, nitrogen is preferentially adsorbed over oxygen and the pressure swing adsorption method may be employed to produce an oxygen enriched product. When argon and methane are separated by a zeolite adsorbent, methane is the adsorbed component and argon is the unadsorbed component.

The molecular sieve or activated carbon adsorbent material in the pressure swing adsorption unit must have a greater selectivity for methane and carbon monoxide than for argon. Both calcium and sodium aluminosilicate zeolites may be employed Carbon molecular sieves and silica molecular sieves are also useful. Suitable zeolite sieves include, but are not limited to, the 5A, 10X, 13X, and mordenites. Preferred zeolite sieves are the 5A medical grade zeolite sieve, commercially available from Union Oil Products, Inc. (UOP), and molecular sieves with comparable pore size and molecular attraction. The 5A medical grade zeolite sieve provides excellent selectivity for argon compared to carbon monoxide and methane and is able to remove virtually all of the methane and carbon monoxide yielding a product gas containing levels of only fractional parts per million (ppm) of methane. Removal of methane from the product gas in the pressure swing adsorption step is important. Methane in the product gas concentrates in the pure argon product in the cryogenic fractional distillation unit. Hence, expensive downstream purification steps would be required if the pressure swing adsorption product gas were to contain high levels of methane. A methane and carbon monoxide level equal to or less than about 20 ppm is typically required in the product. Preferably, the methane and carbon monoxide level is about 1 ppm or less, and more preferably about 0.5 ppm or less.

By varying the product to feed ratio, either by changing the rate of product flow or cycle time, the argon yield at various operating pressures, corresponding to zero methane concentration in the product, can be determined by gas chromatograph-thermal conductivity analysis of the pressure swing adsorption product stream. Argon yield is moderately reduced with increasing pressure beyond 100 psia. The variation of argon yield with pressure shows that the separation of methane and carbon monoxide from argon is controlled by the efficiency of the regeneration step. The higher the amount of methane and carbon monoxide removed during pressure swing adsorption bed regeneration, the higher will be the argon-methane and argon-carbon monoxide selectivity.

During pressure swing adsorption separation, carbon monoxide, methane and part of the nitrogen are removed from the feed mixture as vent gas. A certain amount of argon is lost with the vent gas. This loss of argon results from argon adsorbed in the sieves at the pressure swing adsorption operation pressure, and argon present in the bed voids and discharged during the depressurization step.

Although a particular pressure swing adsorption cycle sequence was illustrated as a preferred embodiment (Table 1), other variations of pressure swing adsorption process cycle sequences may be employed. A simple pressure swing adsorption process cycle sequence may consist of the following steps: (i) adsorption wherein feed mixture enters the bottom of bed A1 and the argon rich gas fraction exits the top of bed A2, (ii) bed pressure equalization through the top and bottom ends of the bed to depressurize the bed, (iii) countercurrent vent, (iv) vacuum regeneration to remove components strongly adsorbed in the bed, (v) bed pressure equalization to partially repressurize the regenerated bed, and (vi) repressurization using a product backfill. This simple sequence will result in an argon yield (ratio of the quantity of argon present in the argon enriched product to the quantity of argon present in the feed mixture) of about 70%.

The process cycle sequence illustrated in Table 1 can increase the argon yield to approximately 85%. The secondary product recycle step incorporated in the process sequence referred to in Table 1 reduces argon loss by permitting the withdrawal of substantial amounts of argon containing bed void gas and gas weakly bound to the adsorbent for recycle to the pressure swing adsorption process feed mixture. The selection of an intermediate location for withdrawing the secondary product increases the amount of secondary product withdrawn without affecting the primary argon enriched product purity. If the secondary product is withdrawn from the top of the adsorption bed, then the quantity of the product withdrawn, without affecting product purity, will be limited and the net argon recovery that can be achieved will only be between about 75% and about 80%. When the secondary product is withdrawn from an intermediate position in the bed, the beds need not be separate vessels (bed A1 and bed A2, for example) but may be two regions inside a single vessel between which a side port is located for withdrawing the secondary product.

The argon yield may be improved to 90% or greater by including a cocurrent purge during the secondary product production step. In this variation of the cycle, a portion of the methane and carbon monoxide rich fraction is compressed and fed as cocurrent purge gas to the bottom end of the adsorption bed (inlet of bed A1, for example) during the secondary product production from the position between the two adsorption regions (between bed A1 and bed A2, for example). The cocurrent purge, also referred as sweep or displacement gas, displaces the argon near the feed end of the adsorption bed (feed end of bed A1, for example) further along and permits removal of more argon with the secondary product.

In yet another process cycle variation, the secondary production step is split into two parts. In the first part, the top region (bed A2, for example) is opened to the secondary product line while cocurrent purge gas is admitted to the lower region (bed A1, for example). In the second part, the top region is isolated and the bottom region is opened to the secondary product line. To conduct this process cycle variation, two additional stop valves must be provided to isolate the two regions from each other and from the secondary product line.

In a preferred embodiment, the pressure swing adsorption separation comprises the step of recycling a secondary depressurization product from the bed in the pressure swing adsorption system into the feed mixture passing to the pressure swing adsorption system. In another preferred embodiment, the secondary depressurization product from the pressure swing adsorption system is withdrawn from the product end of the bed in the pressure swing adsorption system. In another preferred embodiment, the secondary depressurization product from the pressure swing adsorption system is withdrawn from an intermediate location in the bed in the pressure swing adsorption system.

The secondary product withdrawal location is preferably as close as possible to the product end of the adsorption bed. The volume of bed A2, for example, must be as small as possible compared to the volume of bed A1. The volume of A2 must, however, be large enough so that the argon enriched product purity is not affected as a result of secondary product production. During the production cycle, concentration fronts are formed for each of the components in the feed. Components that are strongly adsorbed (e.g. methane) exist at feed concentration in the gas phase near the entrance of the bed. Over a length equal to the equilibrium saturation zone, the gas phase concentration is constant. Beyond this length the concentration decreases sharply. In the present separation (methane, carbon monoxide, and nitrogen from the feed mixture), the production of argon rich primary product must be stopped when the equilibrium methane front is well within the pressure swing adsorption bed since only a fractional ppm level methane in the primary product can be tolerated The product end of a pressure swing adsorption bed at the completion of the production step thus contains predominant amounts of argon which mainly accounts for the argon losses with the vent. It is desirable to collect a secondary product in a direction cocurrent to feed by moderate pressure reduction of the pressure swing adsorption beds before secondary product vent is initiated. The secondary product contains a significant amount of argon along with nitrogen and only a small amount of methane and carbon monoxide. The quantity of this product is only about 10-25% of the feed mixture flow rate.

When a small quantity of secondary product, for example 5-10% of feed, is collected and recycled, it is preferable to withdraw the secondary product stream from the top of the bed. If greater than 10% of the feed is collected for recycle, the secondary product stream should be withdrawn from an intermediate location on the bed. This method prevents contamination of the high pressure argon rich product.

The pressure swing adsorption unit must be regenerated periodically. Suitable modes of regeneration include (i) regeneration at or below 25 psia coupled with product purge or purge from an external source, and (ii) vacuum regeneration. The nitrogen rich distillate stream from the cryogenic separation step can be effectively used as an external purge gas.

The reflux for the cryogenic fractional distillation system may optionally be provided by liquid nitrogen produced in a recirculating refrigeration loop with the column reboiler acting as the heat sink for a heat pump. Alternatively, imported liquid nitrogen can be stored in tanks and circulated in metered amounts to provide the reflux. The nitrogen vapor can be recycled to the ammonia plant synthesis loop.

Throughout this application, various publications have been referenced The disclosures in these publications are incorporated herein by reference in order to more fully describe the state of the art.

The embodiments described herein are merely exemplary and a person skilled in the art may make many variations and modifications without departing from the spirit and scope of the invention. All such modifications and variations are intended to be included within the scope of the invention as defined in the appended claims.

We claim:

1. A method for recovering argon from a feed mixture comprising argon, carbon monoxide, methane, hydrogen, and nitrogen which comprises the steps of:
   (a) passing the feed mixture through a pressure swing adsorption system to remove carbon monoxide, methane and part of the nitrogen thereby producing a fraction containing an increased amount of argon; and
   (b) passing the argon fraction to a cryogenic fractional distillation system to remove hydrogen and the remaining nitrogen in the fraction as a distillate product and to produce a pure argon product.

2. The method according to claim 1, wherein the feed mixture comprises argon in an amount greater than about 3%, carbon monoxide in an amount up to about 40%, methane in an amount up to about 40%, nitrogen in an amount up to about 50%, and hydrogen in an amount up to about 30%.

3. The method according to claim 1, further comprising the step of removing a portion of the hydrogen in the feed mixture prior to step (a) to reduce the hydrogen concentration in the feed mixture to less than about 30%.

4. The method according to claim 3, wherein the method of removal of a portion of the hydrogen from the feed mixture prior to step (a) is pressure swing adsorption, cryogenic distillation, or membrane separation.

5. The method according to claim 1, wherein the feed mixture is a liquid feed mixture.

6. The method according to claim 5, wherein the liquid feed mixture is vaporized by passing the mixture through a distillation column condenser in the cryogenic fractional distillation system to extract refrigeration for the reflux to the distillation column.

7. The method according to claim 1, wherein the pressure swing adsorption system contains an adsorbent material selected from the group consisting of molecular sieves and activated carbon.

8. The method according to claim 7, wherein the adsorbent material is an aluminosilicate zeolite selected from the group consisting of 5A, 10X, 13X, and mordenites.

9. The method according to claim 1, wherein the pressure swing adsorption system is operated at an adsorption pressure in the range from about 25 psia to about 800 psia.

10. The method according to claim 1, further comprising the step of passing vent gas from the pressure swing adsorption system to an equalization tank to minimize loss of void gas.

11. The method according to claim 1, further comprising the step of recycling a secondary depressurization product from a bed in the pressure swing adsorption system into the feed mixture passing to the pressure swing adsorption system.

12. The method according to claim 11, wherein the secondary depressurization product from the pressure swing adsorption system is withdrawn from the product end of the bed in the pressure swing adsorption system.

13. The method according to claim 11, wherein the secondary depressurization product from the pressure swing adsorption system is withdrawn from an intermediate location in the bed in the pressure swing adsorption system.

14. The method according to claim 1, wherein adsorbent material in the pressure swing adsorption system undergoes periodic regeneration under vacuum.

15. The method according to claim 1, wherein adsorbent material in the pressure swing adsorption system undergoes periodic regeneration with a purge gas.

16. The method according to claim 1, further comprising the step of backfilling the pressure swing adsorption system with product gas to repressurize the pressure swing adsorption system to increase the purity of the product.

17. The method according to claim 1, wherein the argon rich fraction withdrawn from the pressure swing adsorption system is cooled by a heat exchanger with waste gas leaving the cryogenic fractional distillation system prior to passing the argon fraction to the cryogenic fractional distillation system.

18. The method according to claim 1, further comprising the step of recirculating a refrigerant in the cryogenic fractional distillation system in a refrigerating heat pump cycle by using a column reboiler in the cryogenic fractional distillation system as a heat sink for the refrigerating cycle to provide refrigeration at a column condenser.

19. The method according to claim 1, wherein the concentration of methane and carbon monoxide in the pure argon product is less than about 20 ppm.

20. The method according to claim 19, wherein the concentration of methane and carbon monoxide in the pure argon product is less than about 1 ppm.

21. A method for recovering argon from a feed mixture comprising argon, carbon monoxide, methane, hydrogen, and nitrogen which comprises the steps of:
  (a) passing the feed mixture through a first cryogenic fractional distillation system to remove carbon monoxide, nitrogen and hydrogen as distillate products and to produce a fraction containing an increased amount of argon; and
  (b) passing the argon fraction to a second cryogenic fractional distillation system to remove methane and to produce pure argon as a distillate product.

22. The method according to claim 21, wherein the feed mixture comprises argon in an amount greater than about 3%, carbon monoxide in an amount up to about 40%, methane in an amount up to about 40%, nitrogen in an amount up to about 50%, and hydrogen in an amount up to about 30%.

23. The method according to claim 21, further comprising the step of recirculating a refrigerant in the cryogenic fractional distillation system in a refrigerating heat pump cycle by using a column reboiler in the cryogenic fractional distillation system as a heat sink for the refrigerating cycle to provide refrigeration at a column condenser.

24. A method for recovering argon from a feed mixture comprising argon, carbon monoxide, methane, hydrogen, and nitrogen which comprises the steps of:
  (a) passing the feed mixture through a first cryogenic fractional distillation system to remove methane and to produce a fraction containing an increased amount of argon as a distillate product; and
  (b) passing the argon fraction to a second cryogenic fractional distillation system to remove nitrogen, hydrogen, and carbon monoxide as a distillate product and to produce a pure argon product.

25. The method according to claim 24, wherein the feed mixture comprises argon in an amount greater than about 3%, carbon monoxide in an amount up to about 40%, methane in an amount up to about 40%, nitrogen in an amount up to about 50%, and hydrogen in an amount up to about 30%.

26. The method according to claim 24, further comprising the step of recirculating a refrigerant in the cryogenic fractional distillation system in a refrigerating heat pump cycle by using a column reboiler in the cryogenic fractional distillation system as a heat sink for the refrigerating cycle to provide refrigeration at a column condenser.

* * * * *